United States Patent [19]

Khanarian et al.

[11] Patent Number: 4,971,416
[45] Date of Patent: Nov. 20, 1990

[54] POLYMERIC WAVEGUIDE DEVICE FOR PHASE MATCHED SECOND HARMONIC GENERATION

[75] Inventors: Garo Khanarian, Union, N.J.; Robert Norwood, Bethlehem, Pa.

[73] Assignee: Hoechst Celanese Corp., Somerville, N.J.

[21] Appl. No.: 405,501

[22] Filed: Sep. 11, 1989

[51] Int. Cl.$^5$ ............................ G02B 6/00; G02F 1/35
[52] U.S. Cl. .............................. 350/96.12; 350/96.34; 307/430
[58] Field of Search ............... 350/96.11, 96.12, 96.13, 350/96.14, 96.15, 96.29, 96.34; 307/425, 426, 427, 428, 429, 430

[56] References Cited

U.S. PATENT DOCUMENTS

| | | | |
|---|---|---|---|
| 3,688,124 | 8/1972 | Freund et al. ................... | 307/427 |
| 3,719,411 | 3/1973 | Ballman et al. .................. | 350/96.12 |
| 3,830,555 | 8/1974 | Warner ............................. | 350/96.12 |
| 3,842,289 | 10/1974 | Yariv et al. ..................... | 350/96.12 |
| 3,995,936 | 12/1976 | Hepner et al. ................... | 350/96.12 |
| 4,054,362 | 10/1977 | Baues ............................... | 350/96.14 |
| 4,767,169 | 9/1988 | Teng et al. ...................... | 350/96.12 |
| 4,792,208 | 12/1988 | Ulman et al. .................... | 350/96.12 |
| 4,865,406 | 9/1989 | Khanarian et al. .............. | 350/96.12 |

*Primary Examiner*—William L. Sikes
*Assistant Examiner*—Akm E. Ullah
*Attorney, Agent, or Firm*—Depaoli & O'Brien

[57] ABSTRACT

In one embodiment this invention provides a parametric frequency converting device which comprises a thin film of a polymeric medium which exhibits second order nonlinear optical response, and the device has heat control means for temperature tuning of the waveguide medium to phase match the propagation constants of fundamental and second harmonic light beams. In a preferred device the waveguiding medium has a spatial periodic structure for quasi-phase matching of the propagating wave energy, and optionally has a set of electrodes for application of a direct current electric field to the waveguiding medium.

18 Claims, 2 Drawing Sheets

POLYMERIC WAVEGUIDE DEVICE FOR PHASE MATCHED SECOND HARMONIC GENERATION

This invention was made with Government support under Contract No F30602-87-C-0218 awarded by the Department of Defense (DOD). The Government has certain rights in this invention.

CROSS-REFERENCE TO RELATED PATENT APPLICATION

The subject matter of this patent application is related to that disclosed in patent application Ser. No. 269,802, filed Nov. 9, 1988 now U.S. Pat. No. 4,865,406.

BACKGROUND OF THE INVENTION

There is an increasing interest in the development of a compact diode laser source in the 400–500 nm range for advanced applications, such as the enhancement of optical disk technology through improved data storage, retrieval storage density, and data capture rates.

There are several possible approaches to a prospective short-wavelength diode laser source. The traditional diode materials such as the ternary and quaternary compounds of In, Ga, As, Al, P, and Sb do not have a direct energy gap high enough to produce a short wavelength laser. A number of other laser materials have been studied for development of diode laser sources in the blue wavelength region. These materials include II–VI semiconductors, quantum well materials, and other wide band gap semiconductors such as cadmium sulfide (CdS). Although the blue quantum well structure shortens the lasing wavelength, it requires a cryogenic condition for lasing. There also has been investigation of II–VI wide-gap superlattices with the goal of achieving diode emission in the blue-green region of the spectrum, but these materials have only produced optically pumped lasers requiring cooling at liquid nitrogen temperature. Other semiconductors that are known to lase in the 450–500 nm range are CdS, ZnSe, ZnCdS, and CdSeS. Lasers of these materials require either optical or electron beam pumping for their operation.

In view of the impracticality of a direct diode laser source, attractive alternatives involve frequency conversion of available diode laser sources, either by frequency doubling or parametric up-conversion. The traditional frequency conversion techniques utilize phase matching of input beams and harmonic waves in second order optical crystals such as potassium dihydrogen phosphate (KDP and KD*P), LiNbO$_3$ and LiIO$_3$. However, because of the relatively low values of second order susceptibility of these crystals, and the low beam intensity of a diode laser, an exceptionally lone single crystal is required to achieve appreciable lower conversion to the second harmonic tensor. Such large crystal dimensions preclude the design and fabrication of a compact and ruggedized optical recording system. In addition, the provision of large inorganic crystals is difficult and costly.

In general, classical phase matching (e.g., via angle or thermal tuning) requires a certain combination of intrinsic birefringence and dispersion of refractive indices. New small molecular weight crystalline organic nonlinear optical materials with high second harmonic susceptibility have been reported in literature such as ACS Symposium, Series No. 233, pages 1–26, 1983 by Garito et al. These organic materials usually possess high intrinsic birefringence and positive dispersion so that phase matching can be achieved with a single crystal. Even if phase matching can be achieved with the new types of organic materials having high nonlinear optical susceptibility, the low beam power of a diode laser significantly limits the lower conversion efficiency. The high birefringence of the organic materials also lowers the conversion efficiency because of beam walk-off An alternative means to achieve phase matched conditions is the use of dispersion properties for different modes in a waveguide. Since the energy is confined laterally to a narrowly constricted space, a high light intensity is possible with a relatively low power source. In this approach, one usually excites a lower order mode of the fundamental beam and the second harmonic generated propagates in a higher order mode. If the waveguide geometry and refractive indices of the guiding region and cladding region are such that:

$$\Delta\beta = \beta_n(\omega_3) - \beta_m(\omega_2) - \beta_1(\omega_1) = 0 \tag{1}$$

then the phase matching condition is established. Here, $\beta_i$ is the propagation constant of the i-th mode. The conversion efficiency is generally quadratically dependent on the overlap integral between the two modes:

$$F = \int E_n(\omega_3, z) E_m(\omega_2, z) E_1(\omega_1, z) dz$$

where E is the normalized electric field of the mode across the waveguide. In general, the overlap between the waveguide modes is limited, and the value of the overlap integral is also small. This approach has been utilized for phase matching in waveguides derived from organic materials, as reported in Optics Commun., 47, 347 (1983) by Hewig et al. However, the level of second harmonic conversion efficiency is too low for any practical frequency doubling application.

Of interest with respect to the present invention is literature relating to spatially periodic nonlinear structures for frequency conversion of electromagnetic energy. The pertinent literature includes IEEE J. of Quantum Elect., QE-9 (No. 1), 9 (1973) by Tang et al; Appl. Phys. Lett, 26, 375(1975) by Levine et al; Appl. Phys. Lett, 37(7), 607(1980) by Feng et al; and U.S. Pat. Nos. 3,384,433; 3,407,309; 3,688,124; 3,842,289; 3,935,472; and 4,054,362.

The thin film waveguides with a periodically modulated nonlinear optical coefficient as described in the literature are either inorganic optical substrates with material fabrication disadvantages, or they are organic materials which are in the liquid phase, such as a liquid crystal medium or a thin film of nitrobenzene which require a continuously applied external DC electric field.

Of particular interest with respect to the present invention is literature relating to the dispersive properties of a thin film optical waveguide for TE and TM modes, as expressed in analytic terms defining the variation of the effective refractive index with respect to one or more physical parameters in the waveguiding medium. The pertinent literature includes J. Appl. Phys., 49(9), 4945(1978) by Uesugi et al; Appl. Phys. Lett , 36(3), 178(1980) by Uesugi; Nonlinear Optics: Proceedings Of The International School Of Materials Science And Technology, Erice, Sicily, July 1–14, 1985 (Springer-Verlag), pages 31–65 by Stegeman et al; Integrated Optics, Volume 48, pages 146–151 by Ostrowsky (Springer-Verlag, 1985) Integrated Optics, Volume 48, pages 196-201 by Bava et al (Springer-Verlag, 1985); and Appl. Opt., 25(12), 1977 (1986) by Hewak et al.

There is continuing interest in the development of compact and efficient nonlinear optical devices, such as frequency converters and parametric oscillators and amplifiers.

Accordingly, it is an object of this invention to provide an organic nonlinear optical waveguide device which is adapted to double the frequency of an input laser beam.

It is another object of this invention to provide a polymeric nonlinear optical waveguide device with a spatial periodic structure for quasi-phase matching of propagating wave tensors, and with a refractive index tuning means for efficient phase mathcing of fundamental and generated second harmonic light beams.

Other objects and advantages of the present invention shall become apparent from the accompanying description and drawings.

DESCRIPTION OF THE INVENTION

One or more objects of the present invention are accomplished by the provision of a parametric frequency converting device which comprises a thin film waveguide of a polymeric medium which exhibits second order nonlinear optical response; wherein the intensity of the second harmonic generation in the optical waveguide is defined by the equation:

$$\frac{I(2\omega)}{I(\omega)} = 2\left(\frac{\mu_o}{\epsilon_o}\right)^{3/2} \frac{\omega^2(d_{eff})^2 L^2}{n(2\omega)n^2(\omega)} \frac{P(\omega)}{A} \frac{\sin^2\left(\frac{\Delta kL}{2}\right)F^2}{\left(\frac{\Delta kL}{2}\right)^2}$$

where $\omega$ is the frequency of the incident fundamental light beam; $\mu_o$ and $\epsilon_c$ are the magnetic permeability and electric permittivity of free space; $d_{eff}$ is the effective nonlinear optical susceptibility of the waveguide medium; $n(\omega)$ and $n(2\omega)$ are the linear refractive indices at frequency $\omega$ and $2\omega$ respectively; A is the area of the light beam; $P(\omega)$ is the light beam power; L is the length of the phase matching region in the waveguide medium; F is the overlap integral as previously defined; and $\Delta k$ is the phase mismatch between the fundamental and second harmonic light wave propagation constants as expressed by the equation:

$$\Delta k = k(2\omega) - k(\omega)^1 - k(\omega)^2$$

where $k(2\omega)$ is the propagation constant for the generated second harmonic light beam; and $k(\omega)^1$ and $k(\omega)^2$ are the propagation constants of the two fundamental field modes (TM or TE) that generate the nonlinear polarization; and wherein the device has heat control means for temperature tuning of the waveguide medium to phase match the propagation constants of the fundamental and second harmonic light beams, so that $\Delta k$ in the above represented equations approaches zero.

The phase matching in an operating invention device can be accomplished by temperature tuning of temperature-dependent birefringence in the waveguide medium, and/or by temperature tuning of a spatial periodic waveguide medium.

In another embodiment this invention provides a parametric frequency converting device which comprises a thin film waveguide of a polymeric medium which exhibits second order nonlinear optical response, and which has a periodic structure for quasi-phase matching of a propagating laser beam; wherein the intensity of the second harmonic generation in the optical waveguide is defined by the equation:

$$\frac{I(2\omega)}{I(\omega)} = 2\left(\frac{\mu_o}{\epsilon_o}\right)^{3/2} \frac{\omega^2(d_{eff})^2 L^2}{n(2\omega)n^2(\omega)} \frac{P(\omega)}{A} \frac{\sin^2\left(\frac{\Delta kL}{2}\right)F^2}{\left(\frac{\Delta kL}{2}\right)^2}$$

where $\omega$ is the frequency of the incident fundamental light beam; $\mu_o$ and $\epsilon_o$ are the magnetic permeability and electric permittivity of free space: $d_{eff}$ is the effective nonlinear optical susceptibility of the waveguide medium; $n(\omega)$ and $n(2\omega)$ are the linear refractive indices at frequency $\omega$ and $2\omega$ respectively; A is the area of the light beam; $P(\omega)$ is the light beam power; L is the length of the phase matching region in the waveguide medium; F is the overlap integral; and $\Delta k$ is the phase mismatch between the fundamental and second harmonic light wave propagation constants as expressed by the equation:

$$\Delta k = k(2\omega) - k(\omega)^1 - k(\omega)^2$$

where $k(2\omega)$ is the propagation constant for the generated second harmonic light beam; and $k(\omega)^1$ and $k(\omega)^2$ are the propagation constants of the two fundamental field modes that generate the nonlinear polarization; and wherein the device has heat control means for temperature tuning of the waveguide medium to phase match the propagation constants of the fundamental and second harmonic light beams, so that $\Delta k$ in the above represented equations approaches zero.

An invention device can have a set of electrodes in a proximate position for application of a direct current electric field to the waveguide medium during the operational temperature tuned phase matching cycle.

In another embodiment this invention provides a nonlinear optical waveguide device for frequency doubling of a 700-1300 nm laser beam which comprises a thin film of a polymeric medium which exhibits second order nonlinear optical response, and which has a spatial periodic structure for quasi-phase matching of propagating wave energy; wherein the spatial periodicity $\Lambda$ of the periodic polymeric medium is defined by the equation:

$$\Lambda = 2 l_c = \frac{2\pi}{\Delta k} = \frac{2\pi}{G}$$

where $l_c$ is the coherence length: $\Delta k$ is the phase mismatch between the fundamental and second harmonic light wave propagation constants as expressed by the equation:

$$\Delta k = k(2\omega) - k(\omega)^1 - k(\omega)^2$$

where $k2\omega)$ is the propagation constant for the generated second harmonic light beam; and $k(\omega)^1$ and $k(\omega)^2$ are the propagation constants of the two fundamental field modes that generate the nonlinear polarization;

and G is the inverse of the spatial periodicity Λ as defined above, and when G≠Δk then $\Delta k' = \Delta k - G \neq 0$; wherein the intensity of the second harmonic generation in the optical waveguide is defined by the equation:

$$\frac{I(2\omega)}{I(\omega)} = 2\left(\frac{\mu_o}{\epsilon_o}\right)^{3/2} \frac{\omega^2(d_{eff})^2 L^2}{n(2\omega)n^2(\omega)} \frac{P(\omega)}{A} \frac{\sin^2\left(\frac{\Delta k' L}{2}\right)}{\left(\frac{\Delta k' L}{2}\right)^2} F^2$$

where ω is the frequency of the incident fundamental light beam; $\mu_o$ and $\epsilon_o$ are the magnetic permeability and electric permittivity of free space; $d_{eff}$ is the effective nonlinear optical susceptibility of the waveguide medium; n(ω) and n(2ω) are the linear refractive indices at frequency ω and 2ω respectively; A is the area of the light beam; P(ω) is the light beam power; L is the length of the phase matching region in the waveguide medium; F is the overlap integral; and Δk' is as defined above; and wherein the device has heat control means for temperature tuning of the waveguide medium quasi-phase matching so that Δk' in the above represented equations approaches zero.

In another embodiment this invention provides a nonlinear optical waveguide device for frequency doubling of a 700–1300 nm laser beam which comprises a thin film of a polymeric medium which exhibits second order nonlinear optical response, and which has a spatial periodic structure for quasi-phase matching of propagating wave energy; wherein the spatial periodicity Λ of the periodic polymeric medium is defined by the equation:

$$\Lambda = 2 l_c = \frac{2\pi}{\Delta k} = \frac{2\pi}{G}$$

where $l_c$ is the coherence length; Δk is the phase mismatch between the fundamental and second harmonic light wave propagation constants as expressed by the equation:

$$\Delta k = k(2\omega) - k(\omega)^1 - k(\omega)^2$$

where k2ω) is the propagation constant for the generated second harmonic light beam; and $k(\omega)^1$ and $k(\omega)^2$ are the propagation constants of the two fundamental field modes that generate the nonlinear polarization; and G is the inverse of the spatial periodicity Λ as defined above, and when G≠Δk then $\Delta k' = \Delta k - G \neq 0$; and where the polymeric medium comprises a polymer having side chains which exhibit second order nonlinear optical susceptibility and consist of at least 25 weight percent of the polymer, and the side chains have an external field-induced molecular orientation orthogonal to the waveguide plane; and wherein the intensity of the second harmonic generation in the optical waveguide is defined by the equation:

$$\frac{I(2\omega)}{I(\omega)} =$$

$$2\left(\frac{\mu_o}{\epsilon_o}\right)^{3/2} \frac{\omega^2(d_{eff})^2 L^2}{n(2\omega)n^2(\omega)} \frac{P(\omega)}{A} \frac{\sin^2\left(\frac{\Delta k' L}{2}\right)}{\left(\frac{\Delta k' L}{2}\right)^2} F^2$$

where ω is the frequency of the incident fundamental light beam; $\mu_o$ and $\epsilon_o$ are the magnetic permeability and electric permittivity of free space; $d_{eff}$ is the effective nonlinear optical susceptibility of the waveguide medium; n(ω) and n(2ω) are the linear refractive indices at frequency ω and 2ω respectively; A is the area of the light beam; P(ω) is the light beam power; L is the length of the phase matching region in the waveguide medium; F is the overlap integral; and Δk' is as defined above; and wherein the device has heat control means for temperature tuning of the waveguide medium quasi-phase matching so that Δk' in the above represented equations approaches zero; and wherein the device has a set of electrodes adapted for application of a direct current electric field to the waveguide medium during the operational temperature tuned phase matching cycle.

Figure 2:
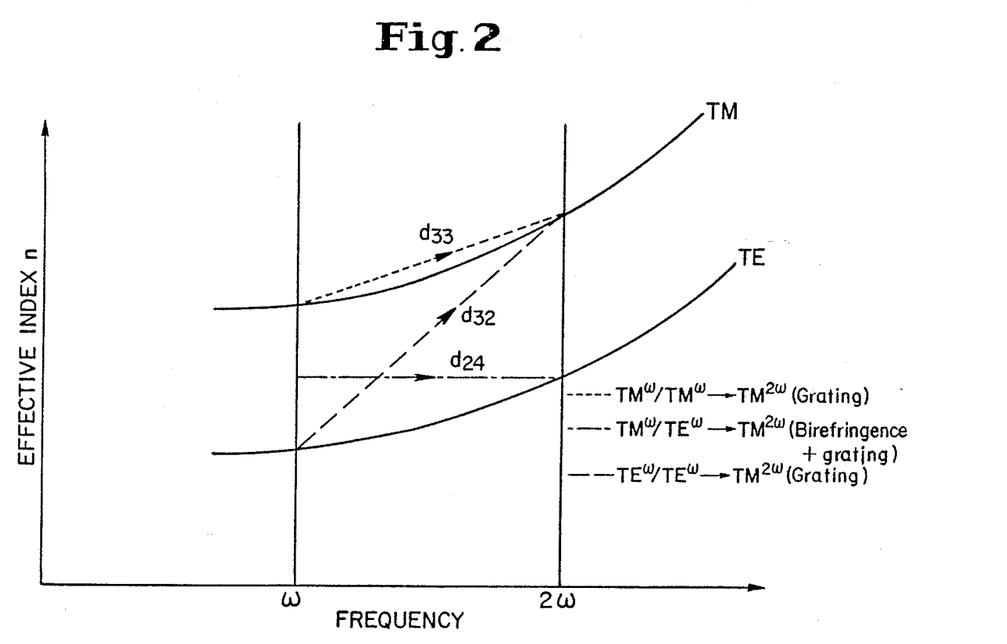
FIG. 2 is a graghic plot illustrating the phase matching states of second order nonlinear optical interaction in an invention device with a poled polymeric waveguide medium having a spatial periodic structure.

In a further embodiment this invention provides a process for optical phase matching in a parametric frequency converting device comprising a single mode thin film waveguide of a birefringent polymeric medium which exhibits second order nonlinear harmonic generation and which has a periodic structure for quasi-phase matching of propagating wave modes, which process comprises (1) coupling a polarized laser beam in the waveguiding polymeric medium, wherein the matching states of second order nonlinear optical interaction in the medium are as represented in FIG. 2, where $TM^\omega/TM^{107} \rightarrow TM^{2\omega}$, $TM^\omega/TE^\omega \rightarrow TE^{2\omega}$ and $TE^\omega/TE^\omega \rightarrow TM^{2\omega}$; and (2) applying controlled heat to effect temperature tuning of the periodic waveguide medium so that Δk' approaches zero, where Δk' is defined by the following expressions:

$$\Lambda = 2 l_c = \frac{2\pi}{\Delta k} = \frac{2\pi}{G}$$

where $l_c$ is the coherence length; Δk is the phase mismatch between the fundamental and second harmonic light wave propagation constants as expressed by the equation:

$$\Delta k = k(2\omega) - k(\omega)^1 - k(\omega)^2$$

where k2ω) is the propagation constant for the generated second harmonic light beam; and $k(\omega)^1$ and $k(\omega)^2$ are the propagation constants of the two fundamental field modes that generate the nonlinear polarization; and G is the inverse of the spatial periodicity Λ as defined above, and when G≠Δk then $\Delta k' = \Delta k - G \neq 0$.

When doubling the frequency of a 700–1300 nm laser beam with an invention waveguide device, an input laser beam power between about 0.1–1 watt yields an output laser beam power of at least about one milliwatt.

The input laser beam typically is in a transverse magnetic (TM) polarization mode, and the propagating mode of the input wave energy is zero-ordered.

A present invention optical frequency converter can be designed with the following material specifications:

| | |
|---|---|
| Nonlinear optical susceptibility $\chi^{(2)}$ | $1 \times 10^{-8}$ esu |

| | |
|---|---|
| Coherence length | 9.5 μm |
| Refractive index | 1.58 |
| Absorption cut-off frequency | 450 nm |

A present invention optical frequency conversion system is characterized by efficient frequency doubling of input laser wave energy, confinement of the propagating wave energy for provision of a high power density, and temperature tuned phase matching between the fundamental and harmonic frequencies.

Referring to the drawings.

Figure 1:
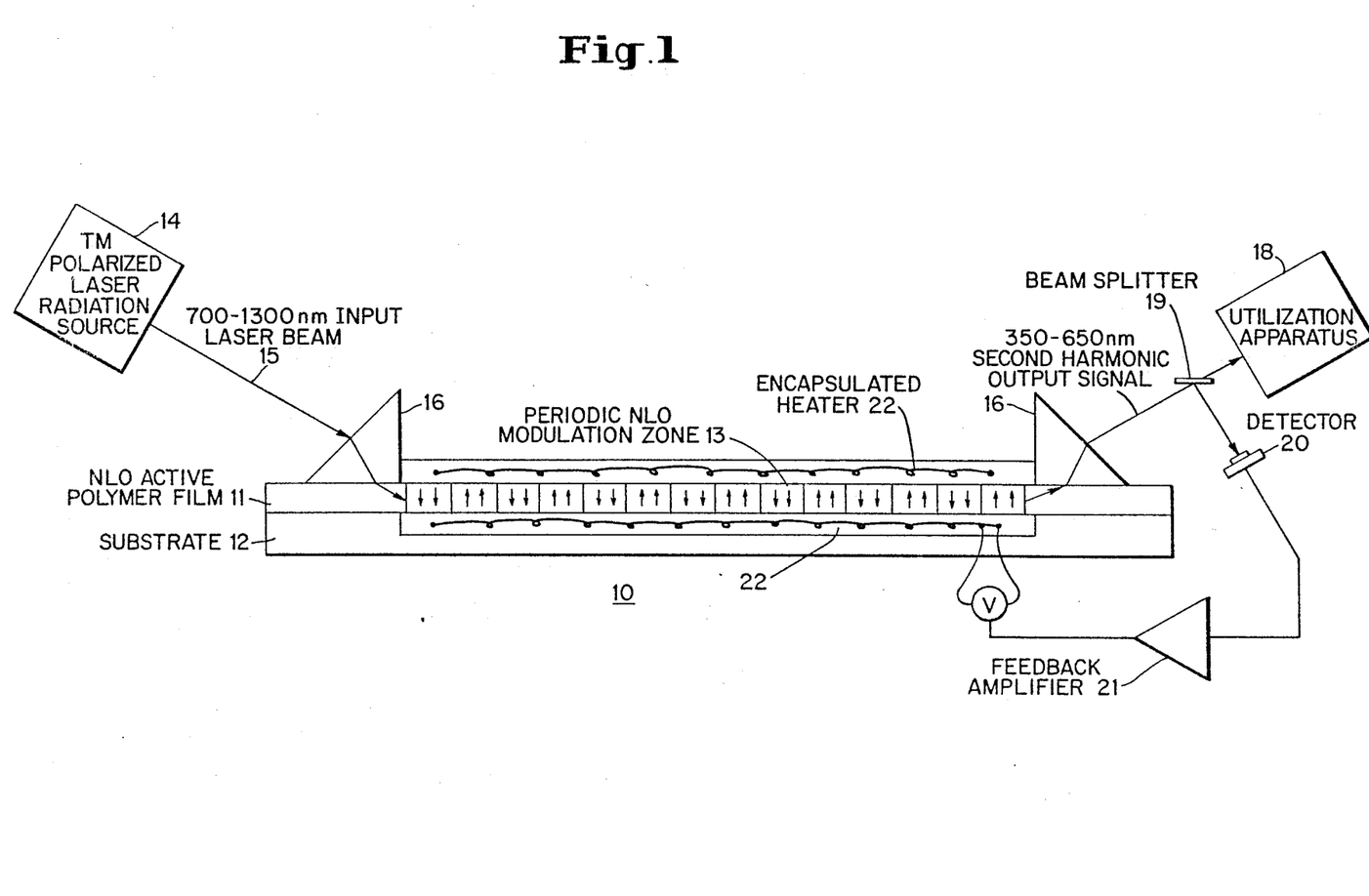
FIG. 1 is a perspective view of a frequency doubling polymeric thin film waveguide in accordance with the present invention.

Thin film waveguide 10 in FIG. 1 is a composite construction of substrate 12 which supports nonlinear optically active polymer film 11. A linear section of polymer film 11 consists of periodic nonlinear optical modulation zone 13.

In practice thin film waveguide 10 is utilized in combination with transverse magnetic (TM) polarized laser radiation source 14 which provides 700-1300 nm input laser beam 15, a pair of prism coupling means 16 which couple laser beam 15 to polymer film 11; and utilization apparatus 18, such as an optical disk data recording unit.

Beam splitter 19 is utilized to direct a portion of the output signal to detector 20, which drives feedback amplifier 21. The heater 22 units are temperature controlled within a ±0.5° C. range, and the temperature is maintained at the point of maximum phase matched $\chi^{(2)}$ generation as monitored by the signal detection means.

The input TM polarized coherent electromagnetic radiation preferably is a laser beam such as that generated by a a diode laser with a wavelength in the 700-1300 nm range.

The coupling means can consist of a pair of prism couplers, such as Schott SF6 optical glass with a high index of refraction. Optical coupling and decoupling also can be accomplished with optical diffraction gratings which are formed directly on the surface of the thin film waveguide, as described in U.S. Pat. Nos. 3,674,335; 3,874,782; and 3,990,775. Another coupling means is through the cleaved end faces of a waveguiding structure.

The substrate 12 as illustrated in FIG. 1 can be constructed of any convenient non-conducting medium such as plastic, glass, or silicon.

The heater units 22 typically are encapsulated in a ceramic or other inorganic medium, or in a polymer medium such as an epoxy resin.

The polymeric thin film waveguiding medium of an invention optical frequency converting device is transparent, either liquid crystalline or isotropic in physical properties, and exhibits nonlinear optical response. The polymer medium has a higher refractive index (e.g., 1.5) than the supporting substrate, or higher than the cladding layer (e.g., souttered silica) if one is composited between the polymer medium and the supporting substrate.

The transparent polymer medium can be applied to the supporting substrate by conventional methods, such as spin coating, spraying, Langmuir-Blodgett deposition, and the like.

The term "transparent" as employed herein refers to a polymeric thin film waveguide medium which is transparent or light transmitting with respect to incident fundamental and created light frequencies. In a present invention frequency converting waveguide device, the polymeric thin film nonlinear optical medium is transparent to both the incident and exit light frequencies.

The term "isotropic" as employed herein refers to a transparent polymeric thin film waveguide medium in which the optical properties are equivalent in all tensor directions.

The term "external field" as employed herein refers to an electric, magnetic or mechanical stress field which is applied to a substrate of mobile polymer molecules, to induce dipolar alignment of the polymer molecules parallel to the field

The term "parametric" as employed herein refers to interactions in wave energy states in an optical medium in which time variations in an input signal are translated into different time variations in an output signal as determined by a nonlinearity parameter.

A present invention polymeric thin film waveguide medium preferably is a polymer having a comb structure of side chains which exhibit nonlinear optical response. This type of chemical structure is illustrated by thermoplastic polymers which are characterized by a recurring monomeric unit corresponding to the formula:

where P' is a polymer main chain unit, S' is a flexible spacer group having a linear chain length of between about 2-20 atoms, M' is a pendant group which exhibits second order nonlinear optical susceptibility, and where the pendant groups comprise at least about 25 weight percent of the polymer, and the polymer has a glass transition temperature or softening point above about 40° C.

Among the preferred types of side chain polymers are those characterized by a recurring monomeric unit corresponding to the formula:

or where m is an integer of at least 5; n is an integer between about 4-20; X is -NR-, -O- or -S-; R is hydrogen or a $C_1$-$C_4$ alkyl; and Z is —$NO_2$, —CN, —$CF_3$, —CH=C(CN)$_2$, —C(CN)=C(CN)$_2$ or —$SO_2CF_3$.

Side chain polymers of interest are described in U.S. Pat. No. 4,694,066. Illustrative of side chain polymer species are poly[6-(4-nitrobiphenyloxy)hexyl methacrylate], poly(L-N-p-nitrophenyl-2-piperidinemethyl acrylate), and stilbene-containing polymers such as:

A preferred feature of a present invention frequency converting waveguide device is a periodic nonlinear optical modulation zone 13 as represented in FIG. 1. The periodicity of a waveguide NLO modulation zone preferably is accomplished by poling with an electric field to achieve molecular orientation of the polymer side chains parallel to the direction of the electric field. The poling induces a macroscopic noncentrosymmetry in the poled domains of the polymer medium, and establishes second order nonlinear optical susceptibility in the polymer medium.

Poling of a thin film waveguide medium can be accomplished conveniently by heating the medium near or above its melting point or glass transition temperature, then applying a DC electric field (e.g., 50–150 V/$\mu$m ) to the medium to align molecular dipoles in a uniaxial orientation. The medium then is cooled while the medium is still under the influence of the applied DC electric field. In this manner a stable and permanent molecular orientation is immobilized in a rigid structure within the poled domains.

The poling can be applied to a polymer medium that is substrate-supported, by an appropriate placement of upper and lower electrode units, where one of which may have a grating configuration.

The following examples are further illustrative of the present invention. The device components are presented as being typical, and various modifications in design and operation can be derived in view of the foregoing disclosure within the scope of the invention.

EXAMPLE I

A.

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian electron beam vacuum deposition system. A 0.1 $\mu$m layer of 99.999% purity aluminum is deposited on the wafer.

AZ-1518 positive photoresist (Hoechst) is spin-coated on the aluminum-coated wafer with a Solitec model 5100 coater. A 1.5 $\mu$m photoresist coating is achieved by spinning at 5000 rpm for 30 seconds. The photoeresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 $\mu$m radiation (70 mJ/cm$^2$).

The mask is removed, and a thin piece of silicon (1 cm$\times$2 cm) is placed on the surface of the patterned photoresist as a protective shield, and the combination is exposed to 70 mJ/cm$^2$ of 405 $\mu$m radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water, and the photoresist is removed with acetone.

The aluminum grating electrode surface of the wafer then is covered with a 1.5 $\mu$m cladding layer of 20% polyvinyl alcohol (75% hydrolyzed) in water by spin-coating at 5000 rpm for 30 seconds, and the cladding layer is dried in a vacuum oven at 110° C. for two hours.

A nonlinear optically active organic layer of 1.65 $\mu$m thickness is spin-coated on the cladding layer at 3000 rpm. The spin-coating medium is a 20% solution of a copolymer (50/50) of methyl methacrylate/4-(methacryloyloxy-2-hexoxy)-4'-nitrostilbene in trichloropropane. The organic layer is dried in a vacuum oven at 160° C. for one hour.

An upper cladding layer of 1.5 $\mu$m thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 $\mu$m coating of aluminum is deposited as an electrode layer on the upper cladding layer.

The waveguide structure is cleaved at opposite ends to provide two sharp faces to couple light in and out of the polymeric waveguiding layer.

Cylindrical lenses are employed to focus and couple 1.34 $\mu$m radiation (0.01 mJ, 10 nsec wide pulse) into the waveguide. The waveguide is placed on a hot stage with a ±0.5° C. temperature control means. The hot stage is mounted on a rotation stage such that the effective periodicity of the grating can be changed. Electrical wires are attached to the top and bottom electrodes of the waveguide and connected to a power supply.

Figure 3:
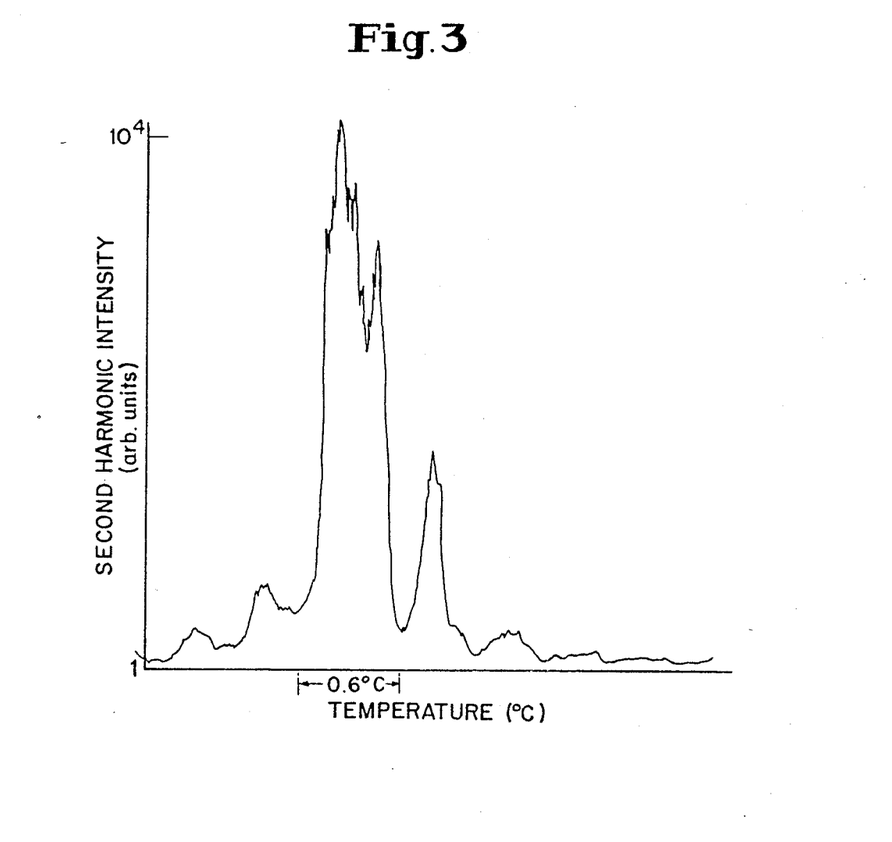
FIG. 3 is a graphic plot of phase matched second harmonic generation with a periodically poled waveguide as described in Example I.

An electric field (85 v/$\mu$m) is applied across the waveguide. The rotation stage is set close to the phase matching angle, but no significant amount of second harmonic is observed. The temperature of the stage then is slowly increased (1° C./min ) and the second harmonic intensity is monitored. As 76° C. is approached there is a large increase in second harmonic intensity (as illustrated in the FIG. 3 temperature tuning curve), indicating that phase matching had occurred over at least 1 mm of waveguide. The increase and decrease in SHG occurs within a 0.6° C. range. The polarization of the input and output radiation are TM, indicating that the interaction is occurring through $d_{33}$ (TM$^\omega$/TM$^\omega\rightarrow$TM$^{2\omega}$as represented in the FIG. 2 phase matching interactions). The temperature tuning is reversible, i.e., when the temperature is decreased, the curve shown in FIG. 3 is reproduced. This nonlinear optical interaction requires the presence of the periodic grating.

As the temperature is increased further, another phase matched interaction is observed at 95° C. of comparable intensity to the one at 76° C. However, this interaction involves the $d_{32}$ tensor element. The input polarization is at 45 degrees (i.e., TE$^\omega$/TM$^\omega$) and the output is TE$^{2\omega}$. This temperature dependence of SHG is also illustrated in FIG. 3. This nonlinear optical interaction is a result of the presence of both the grating and the birefringence induced in the waveguide by poling.

The distance L over which phase matching has occurred can be estimated from the width $\Delta T$ of the temperature tuning curve in accordance with the following calculations.

The temperature dependence arises mainly from the phase matching function:

$$\left[ \frac{\sin(\Delta k'L)/2}{(\Delta k'L)/2} \right]^2$$

In the case of the periodically poled waveguide, $\Delta k' = \Delta k - G$. G is the inverse of the spatial periodicity $\Lambda$ of the waveguide in reciprocal microns, and $$\Delta k = \frac{4\pi[n(2\omega) - n(\omega)]}{\lambda},$$

where n is the effective refractive index in the waveguide, and $\lambda$ is the wavelength of the fundamental light beam. $\Delta k' = 0$ when phase matching is achieved, and $\Delta k'$ varies from zero when the temperature varies from the phase matching temperature, but G stays constant because it is controlled by the periodic electrodes on the silicon substrate. It is assumed that the silicon substrate has a low thermal expansion coefficient as compared to the polymer. Therefore the change in $\Delta k'$ arises solely from $\Delta k$ of the waveguide.

A measure of the temperature range $\Delta T$ in which phase mathcing can occur is provided by the temperature at which second harmonic generation declines to half of its peak power. This occurs when $\Delta k'L = \pi$, and the following relationship can be written:

$$\frac{2\pi L \Delta T \alpha}{\lambda} = \frac{\pi}{2}$$

where $$\alpha = \frac{d[n(2\omega) - n(\omega)]}{dT}$$

is the temperature dependence of the differences the effective indices at $\omega$ and $2\omega$ in the waveguide.

The above equation shows explicitly the dependence of L on $\Delta T$ and $\alpha$. Since $\Delta T$ is obtained from experiment, it is necessary to determine $\alpha$ in order to calculate L. $\alpha$ is calculated from the change of the effective refractive indices in the waveguide with temperature, both at the fundamental and harmonic wavelengths. These changes occur because of variation in material index, and also because of the thickness of the waveguide.

The calculation was performed for a waveguide as fabricated above. First, an estimate was obtained of the material dn/dT parameter for the polymeric waveguiding layer at the fundamental and harmonic frequencies. Second, the increase in thickness of the waveguide with temperature was calculated from the thermal expansion coefficient. Third, the two values were employed to calculate the effective indices in the waveguide using the planar slab waveguide equations as a function of temperature. It was found that $\alpha = -1.32 \times 10^{-5}/°$ C. (rate at which $\Delta k$ approaches zero).

Utilizing the calculated value of $\alpha$ and the $\Delta T$ observed experimentally, it was determined that phase matching occurred over a distance L of about one millimeter or more.

A permanently poled waveguide is achieved in the following manner. A phase matching temperature and poling electric field is established. The temperature then is slowly decreased while making small adjustments to the poling voltage in order to approximate a phase matching state. Small adjustments in the electric field provide small changes in refractive indices. By this procedure, the waveguide is cooled down to room temperature while close to a phase matching state. Small adjustments in temperature or voltage are made during the operation of the device to fine tune the phase matching efficiency.

EXAMPLE II

This Example illustrates the construction and operation of a two-dimensional rib waveguide for optical frequency converting in accordance with present invention.

Following the procedures of Example I, an oxidized silicon substrate (2 microns of $SiO_2$ on Si) is coated with an aluminum grating electrode. A thin (1000 angstroms) polysiloxane layer is spin-coated from a 7% solution at 4000 rpm and cured for 45 minutes at 110° C. A spin-coated Master Bond UV11-4M1 epoxy (Master Bond Inc.) layer 2 microns thick is deposited by spin-coating at 3000 rpm, and curing for 20 minutes under a 25 mw/cm² u.v. mercury-xenon arc lamp. The surface is treated by exposure to a 5 watt r.f. oxygen plasma in a reactive-ion-etcher for 5 seconds and is coated with a nonlinear optically active organic layer (1.25 microns) as in Example I. A second epoxy layer is applied as described above and cured for 5 minutes.

The upper cladding layer is coated with an aluminum masking layer (2000 angstroms). A narrow AZ-1518 photoresist ribbon-like strip (5.5 microns in width) is coated on the aluminum in the waveguiding direction of the laminated structure. The aluminum not covered by the photoresist is removed as in Example I. The upper surface of the waveguide structure is exposed to reactive ion etching to remove the multilayers down to the bottom polysiloxane layer, except for the photoresist coated strip. The etching cycles also remove the photoresist coating from the aluminum strip. The aluminum coating is removed from the ribbon-like strip of multilayers. The substrate and the upper surface multilayer strip are spin-coated with Master Bond UV11-4M1 epoxy at 2500 rpm, and the coating is cured by means of the above described conditions.

Following the procedures of Example I, an upper aluminum grating electrode (1000 angstroms) is constructed on the upper epoxy layer, and the nonlinear optically active polymer layer is molecularly oriented by means of a DC field applied between the electrodes.

The two endfaces in the waveguiding direction are cleaved for end-fire coupling of light into and out of the two-dimensional waveguiding channel. A permanently poled waveguide is achieved by following the procedure described in Example I.

What is claimed is:

1. A parametric frequency converting device which comprises a thin film waveguide of a polymeric medium which exhibits second order nonlinear optical response; wherein the intensity of the second harmonic generation in the optical waveguide is defined by the equation:

$$\frac{I(2\omega)}{I(\omega)} = 2\left(\frac{\mu_o}{\epsilon_o}\right)^{3/2} \frac{\omega^2(d_{eff})^2 L^2}{n(2\omega)n^2(\omega)} \frac{P(\omega)}{A} \frac{\sin^2\left(\frac{\Delta k L}{2}\right)F^2}{\left(\frac{\Delta k L}{2}\right)^2}$$

where $\omega$ is the frequency of the incident fundamental light beam; $\mu_o$ and $\epsilon_o$ are the magnetic permeability and electric permittivity of free space; $d_{eff}$ is the effective nonlinear optical susceptibility of the waveguide medium; $n(\omega)$ and $n(2\omega)$ are the linear refractive indices at frequency $\omega$ and $2\omega$ respectively; A is the area of the light beam; $P(\omega)$ is the light beam power; L is the length of the phase matching region of the waveguide medium; F is the overlap integral; and $\Delta k$ is the phase mismatch between the fundamental and second harmonic light wave propagation constants as expressed by the equation:

$$\Delta k = k(2\omega) - k(\omega)^1 - k(\omega)^2$$

where $k2\omega$) is the propagation constant for the generated second harmonic light beam; and $k(\omega)^1$ and $k(\omega)^2$ are the propagation constants of the two fundamental field modes that generate the nonlinear polarization; and wherein the device has heat control means for temperature tuning of the waveguide medium to phase match the propagation constants of the fundamental and second harmonic light beams, so that $\Delta k$ in the above represented equations approaches zero.

2. A parametric frequency converting device in accordance with claim 1 wherein the phase matching is by temperature tuning of temperature dependent birefringence in the waveguide medium.

3. A parametric frequency converting device in accordance with claim 1 wherein the phase matching is by temperature tuning of a spatial periodic waveguide medium.

4. A parametric frequency converting device which comprises a thin film waveguide of a polymeric medium which exhibits second order nonlinear optical response, and which has a periodic structure for quasi-phase matching of a propagating laser beam; wherein the intensity of the second harmonic generation in the optical waveguide is defined by the equation:

$$\frac{I(2\omega)}{I(\omega)} = 2\left(\frac{\mu_o}{\epsilon_o}\right)^{3/2} \frac{\omega^2(d_{eff})^2 L^2}{n(2\omega)n^2(\omega)} \frac{P(\omega)}{A} \frac{\sin^2\left(\frac{\Delta k L}{2}\right)F^2}{\left(\frac{\Delta k L}{2}\right)^2}$$

where $\omega$ is the frequency of the incident fundamental light beam; $\mu_o$ and $\epsilon_o$ so are the magnetic permeability and electric permittivity of free space; $d_{eff}$ is the effective nonlinear optical susceptibility of the waveguide medium; $n(\omega)$ and $n(2\omega)$ are the linear refractive indices at frequency $\omega$ and $2\omega$ respectively; A is the area of the light beam; $P(\omega)$ is the light beam power; L is the length of the phase matching region of the waveguide medium; F is the overlap integral; and $\Delta k$ is the phase mismatch between the fundamental and second harmonic light wave propagation constants as expressed by the equation:

$$\Delta k = k(2\omega) - k(\omega)^1 - k(\omega)^2$$

where $k2\omega$) is the propagation constant for the generated second harmonic light beam; and $k(\omega)^1$ and $k(\omega)^2$ are the propagation constants of the two fundamental field modes that generate the nonlinear polarization; and wherein the device has heat control means for temperature tuning of the waveguide medium to phase match the propagation constants of the fundamental and second harmonic light beams, so that $\Delta k$ in the above represented equations approaches zero.

5. A parametric frequency converting device in accordance with claim 4 wherein the device has a set of electrodes adapted for application of a direct current electric field to the waveguide medium during the operational temperature tuned phase matching cycle.

6. A nonlinear optical waveguide device for frequency doubling of a 700-1300 nm laser beam which comprises a thin film of a polymeric medium which exhibits second order nonlinear optical response, and which has a spatial periodic structure for quasi-phase matching of propagating wave energy; wherein the periodicity $\Lambda$ of the periodic polymeric medium is defined by the equation:

$$\Lambda = 2\, l_c = \frac{2\pi}{\Delta k} = \frac{2\pi}{G}$$

where $l_c$ is the coherence length: $\Delta k$ is the phase mismatch between the fundamental and second harmonic light wave propagation constants as expressed by the equation:

$$\Delta k = k(2\omega) - k(\omega)^1 - k(\omega)^2$$

where $k2\omega$) is the propagation constant for the generated second harmonic light beam; and $k(\omega)^1$ and $k(\omega)^2$ are the propagation constants of the two fundamental field modes that generate the nonlinear polarization; and G is the inverse of the spatial periodicity $\Lambda$ as defined above, and when $G \neq \Delta k$ then $\Delta k' = \Delta k - G \neq 0$; *wherein the intensity of the second harmonic generation in the optical waveguide is defined by the equation:*

$$\frac{I(2\omega)}{I(\omega)} = 2\left(\frac{\mu_o}{\epsilon_o}\right)^{3/2} \frac{\omega^2(d_{eff})^2 L^2}{n(2\omega)n^2(\omega)} \frac{P(\omega)}{A} \frac{\sin^2\left(\frac{\Delta k' L}{2}\right)F^2}{\left(\frac{\Delta k' L}{2}\right)^2}$$

where $\omega$ is the frequency of the incident fundamental light beam; $\mu_o$ and $\epsilon_o$ are the magnetic permeability and electric permittivity of free space; $d_{eff}$ is the effective nonlinear optical susceptibility of the waveguide medium; $n(\omega)$ and $n(2\omega)$ are the linear refractive indices at frequency $\omega$ and $2\omega$ respectively; A is the area of the light beam; $P(\omega)$ is the light beam power; L is the length of the phase matching region of the waveguide medium; F is the overlap integral; and $\Delta k'$ is as defined above; and wherein the device has heat control means for temperature tuning of the waveguide medium quasi-phase matching so that $\Delta k'$ in the above represented equations approaches zero.

7. A nonlinear optical waveguide device in accordance with claim 6 wherein the device has a set of electrodes adapted for application of a direct current electric field to the waveguide medium during the operational temperature tuned phase matching cycle.

8. A nonlinear optical waveguide device for frequency doubling of a 700–1300 nm laser beam which comprises a thin film of a polymeric medium which exhibits second order nonlinear optical response, and which has a spatial periodic structure for quasi-phase matching of propagating wave energy; wherein the spatial periodicity $\Lambda$ of the periodic polymeric medium is defined by the equation:

$$\Lambda = 2\, l_c = \frac{2\pi}{\Delta k} = \frac{2\pi}{G}$$

where $l_c$ is the coherence length; $\Delta k$ is the phase mismatch between the fundamental and second harmonic light wave propagation constants as expressed by the equation:

$$\Delta k = k(2\omega) - k(\omega)^1 - k(\omega)^2$$

where $k(2\omega)$ is the propagation constant for the generated second harmonic light beam; and $k(\omega)^1$ and $k(\omega)^2$ are the propagation constants of the two fundamental field modes that generate the nonlinear polarization; and G is the inverse of the spatial periodicity $\Lambda$ as defined above, and when $G \neq \Delta k$ then $\Delta k' = \Delta k - G \neq 0$; and where the polymeric medium comprises a polymer having side chains which exhibit second order nonlinear optical susceptibility and consist of a least 25 weight percent of the polymer, and the side chains have an external field-induced molecular orientation orthogonal to the waveguide plane; and wherein the intensity of the second harmonic generation in the optical waveguide is defined by the equation:

$$\frac{I(2\omega)}{I(\omega)} = 2\left(\frac{\mu_o}{\epsilon_o}\right)^{3/2} \frac{\omega^2 (d_{eff})^2 L^2}{n(2\omega)n^2(\omega)} \frac{P(\omega)}{A} \frac{\sin^2\left(\frac{\Delta k' L}{2}\right) F^2}{\left(\frac{\Delta k' L}{2}\right)^2}$$

where $\omega$ is the frequency of the incident fundamental light beam; $\mu_o$ is and $\epsilon_o$ are the magnetic permeability and electric permittivity of free space; $d_{eff}$ is the effective nonlinear optical susceptibility of the waveguide medium; $n(\omega)$ and $n(2\omega)$ are the linear refractive indices at frequency $\omega$ and $2\omega$ respectively; A is the area of the light beam; $P(\omega)$ is the light beam power; L is the length of the phase matching region in the waveguide medium; F is the overlap integral; and $\Delta k'$ is as defined above; and wherein the device has heat control means for temperature tuning of the waveguide medium quasi-phase matching so that $\Delta k'$ in the above represented equations approaches zero; and wherein the device has a set of electrodes adapted for application of a direct current electric field to the waveguide medium during the operational temperature tuned phase matching cycle.

9. A waveguide device in accordance with claim 8 wherein the polymeric thin film is coated on a support substrate.

10. A waveguide device in accordance with claim 8 wherein the polymeric thin film comprises a thermotropic liquid crystalline polymer having a comb structure of mesogenic side 40° C.

11. A waveguide device in accordance with claim 8 wherein the polymeric thin film comprises a polymer with a main chain polyvinyl structure.

12. A waveguide device in accordance with claim 8 wherein the polymeric thin film comprises a polymer with a main chain polysiloxane structure.

13. A waveguide device in accordance with claim 8 wherein the polymeric thin film comprises a polymer with a main chain polyoxvalkylene structure.

14. A waveguide device in accordance with claim 8 wherein the polymeric thin film comprises a polymer with a main chain polyester or polyamide structure.

15. A waveguide device in accordance with claim 8 wherein the polymeric thin film comprises a polymer which is characterized by a recurring monomeric unit corresponding to the formula:

where P' is a polymer main chain unit, S' is a flexible spacer group having a linear chain length of between about 0–20 atoms, M' is a pendant group which exhibits second order nonlinear optical susceptibility, and where the pendant side chains consist of at least about 25 weight percent of the polymer, and the polymer has a glass transition temperature above about 40° C.

16. A waveguide device in accordance with claim 15 wherein the M' group contains a biphenyl structure.

17. A waveguide device in accordance with claim 15 wherein the M' group contains a stilbene structure.

18. A process for optical phase matching in a parametric frequency converting device comprising a single mode thin film waveguide of a birefringent polymeric medium which exhibits second order nonlinear harmonic generation and which has a periodic structure for quasi-phase matching of propagating wave modes, which process comprises (1) coupling a polarized laser beam in the waveguiding polymeric medium, wherein the phase matching states of second order nonlinear optical interaction in the medium where $TM^\omega/TM^\omega \to TM^{2\omega}$, $TM^\omega/TE^\omega \to TE^{2\omega}$ and $TE^\omega/TE^\omega \to TM^{2\omega}$; and (2) applying controlled heat to effect temperature tuning of the periodic waveguide medium so that $\Delta k'$ approaches zero, where $\Delta k'$ is defined by the following expressions:

$$\Lambda = 2\, l_c = \frac{2\pi}{\Delta k} = \frac{2\pi}{G}$$

where $l_c$ is the coherence length; $\Delta k$ is the phase mismatch between the fundamental and second harmonic light wave propagation constants as expressed by the equation:

$$\Delta k = k(2\omega) - k(\omega)^1 - k(\omega)^2$$

where $k2\omega)$ is the propagation constant for the generated second harmonic light beam; and $k(\omega)^1$ and $k(\omega)^2$ are the propagation constants of the two fundamental field modes that generate the nonlinear polarization and G is the inverse of the spatial periodicity $\Lambda$ as defined above, and when $G \neq \Delta k$ then $\Delta k' = \Delta k - G \neq 0$.

* * * * *